Figure 1:

United States Patent [19]

Marianowski et al.

[11] 4,079,171

[45] Mar. 14, 1978

[54] MOLTEN CARBONATE FUEL CELL ELECTROLYTE

[75] Inventors: Leonard G. Marianowski, South Holland; Elias Humberto Camara, Bolingbrook; Hansraj Champshi Maru, Darien, all of Ill.

[73] Assignee: Institute of Gas Technology, Chicago, Ill.

[21] Appl. No.: 803,562

[22] Filed: Jun. 6, 1977

[51] Int. Cl.$^2$ .................................................. H01M 8/14
[52] U.S. Cl. ........................................................... 429/46
[58] Field of Search .......................................... 429/46

[56] References Cited

U.S. PATENT DOCUMENTS

| | | | |
|---|---|---|---|
| 3,466,197 | 9/1969 | Bawa | 429/46 |
| 4,009,321 | 2/1977 | Baker et al. | 429/46 |

*Primary Examiner*—John H. Mack
*Assistant Examiner*—H. A. Feeley

*Attorney, Agent, or Firm*—Thomas W. Speckman

[57] ABSTRACT

An improved molten carbonate fuel cell electrolyte wherein the inert support matrix is predominately $LiAlO_2$ having crystalline structure with an average L/D greater than about 3 and surface area greater than about 5 sq. meters/gram and the carbonates composition is a ternary lithium-potassium-sodium or binary lithium-potassium or lithium-sodium carbonates composition having a thermal expansion of about 1.5 to about $3.5 \times 10^{-5}$ inch/inch ° C. The improved molten carbonate fuel cell electrolyte of this invention provides fuel cell electrolytes capable of containing 50 to 70 wt. percent carbonate components to provide high power densities while providing a thin electrolyte which is resistant to physical damage on thermal cycling of the fuel cell. The electrolyte of this invention may also be reinforced with metallic alloys to provide additional strength characteristics.

26 Claims, 2 Drawing Figures

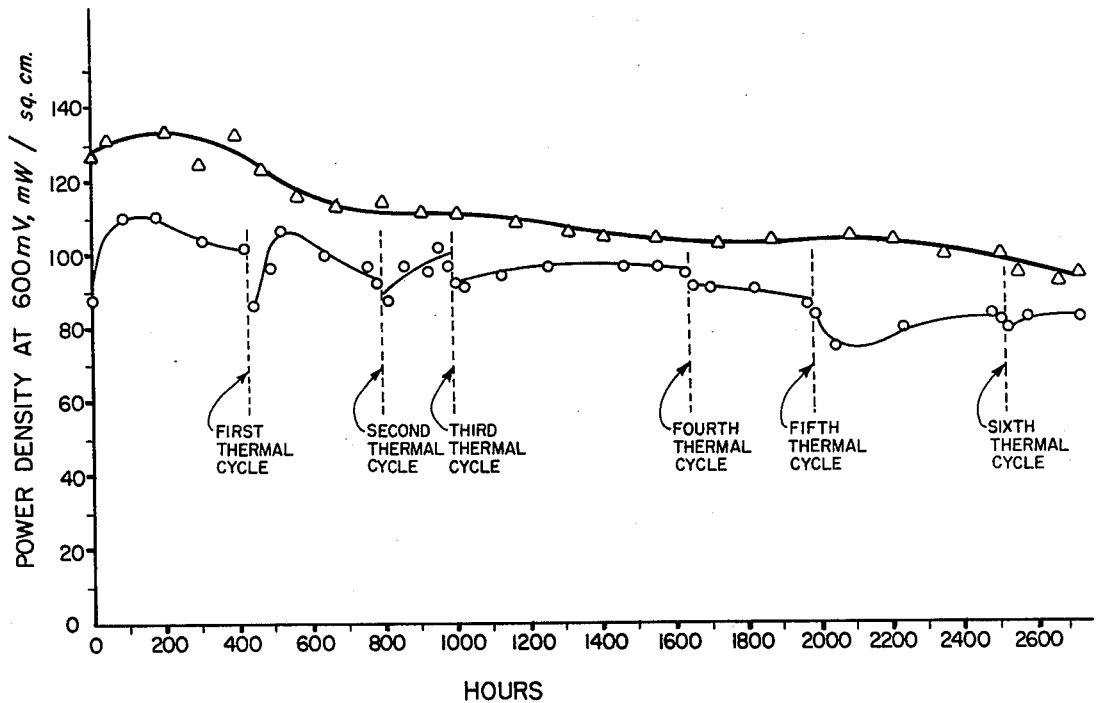

MOLTEN CARBONATE FUEL CELL ELECTROLYTE

This invention relates to molten carbonate fuel cells and particularly to an electrolyte-matrix and the process of making such electrolyte-matrix for use in molten carbonate fuel cells. The invention further relates to the reinforcement of the electrolyte-matrix made in accordance with this invention and an improved molten carbonate fuel cell utilizing the electrolyte-matrix of this invention.

Molten carbonate fuel cells generally comprise a cathode, an anode and an electrolyte-matrix making contact to both the cathode and anode. In operation, hydrogen reacts on the anode side of the electrolyte and an oxidant reacts on the cathode side of the electrolyte producing a flow of current in an external circuit connecting the anode and cathode. At these reaction sites there must be ready entry for the reactant gases, ready exit for the reaction products, ready availability of the current-carrying electrolyte ion and ready exit for the product electrons. To optimize these requirements at the gas-electrolyte-electrode interface, both electrode and electrolyte design and properties must stabilize this interface. Intimate mixtures of the carbonate electrolyte and inert material to form an electrolyte diaphragm may be used to meet these requirements. Under fuel cell operating conditions in the range of 500° to 700° C. the carbonate component is molten and the entire electrolyte system, the carbonate and the inert support material forms a paste. Thus, the electrolyte diaphragms of this type are known as paste electrolytes.

The electrolyte is in direct contact with the electrodes and must provide gas tightness in the seals between the electrolyte and electrode or electrode holder. One of the problems which has been experienced with prior electrolytes has been the inability of the electrolyte to withstand thermal cycling between the operating temperature of the cell and room temperature and back to operating temperature with little change in cell performance. The problems of thermal cycling are especially severe when using thin electrolytes which are desirable to minimize the resistive loss. The use of thin electrolytes in cells having a large active area has presented especially severe problems of maintenance of power density with thermal cycling. Previous electrolytes such as taught by U.S. Pat. No. 4,009,321 having an inert matrix of lithium aluminate and alkali carbonates mixture carbonate portion thicker than about 0.1 inch have been satisfactorily thermal cycled between cell operating temperature and room temperature for up to 12 cycles with less than about 5 percent variation in power density in small cells having an active area of about 3 sq. cm. However, in large cells of about 175 sq. cm. active area this problem is increased and such electrolytes of about 0.100 inch thickness have lost almost half of their maximum power density in 2 cycles and become inoperable after a third cooling cycle. Such prior electrolytes thinner than about 0.1 inch and down to about 0.05 to about 0.06 inch did not cycle satisfactorily even in small cells having an active area of about 3 sq. cm.

We have found that improved thermal cycling of molten carbonate fuel cells can be achieved by use of electrolytes having specified inert support compositions and specified carbonate compositions. The use of alkali metal aluminates as an inert carrier material and the use of alkali metal carbonates as paste electrolyte compositions in high temperature molten carbonate fuel cells is known to the art, such as disclosed in U.S. Pat. No. 4,009,321. However, as pointed out in U.S. Pat. No. 3,466,197, as well as the above comments, as thinner and larger area electrolytes are desired, problems with the failure of the tile portion of the electrolyte increase. The importance of thermal expansion in cell design has been recognized in molten carbonate fuel cells as pointed out in the chapter "The Use of Ceramics in Molten Carbonate Fuel Cells," by A. C. C. Tseung and A. D. S. Tantram, in "Science of Ceramics," edited by G. H. Stewart, Volume 4, published by The British Ceramic Society, 1968, pages 367–379. The present invention is directed to an improved electrolyte composition providing improved thermal cycling properties.

It is an object of this invention to provide a molten carbonate fuel cell electrolyte which permits thermal cycling of the fuel cell from reaction temperatures to room temperatures without significant decrease in cell power output.

It is still another object of this invention to provide fuel cell electrolytes capable of containing 50 to 70 percent carbonate components to provide high power densities necessary for a practical fuel cell.

It is yet another object of this invention to provide an electrolyte for use in a molten carbonate fuel cell which is resistant to physical damage on thermal cycling of the fuel cell.

It is another object of this invention to provide reinforced electrolyte for use in a molten carbonate fuel cell.

Other objects and advantages of the invention will become apparent from the following description taken in conjunction with the accompanying drawings showing preferred embodiments in which:

FIG. 1 is an electron micrograph showing the crystalline structure of a lithium aluminate inert support matrix in a fuel cell electrolyte according to this invention; and FIG. 2 is a graph showing the stability of power density of a molten carbonate fuel cell according to one embodiment of this invention.

The inert support or matrix portion of the electrolyte of this invention is principally lithium aluminate and preferably initially primarily betalithium aluminate ($LiAlO_2$) having a specified crystalline structure. One general method of production of beta-lithium aluminate and the x-ray powder diffraction characteristics of betalithium aluminate ($LiAlO_2$) are described in U.S. Pat. No. 3,998,939. We have discovered that using principally lithium aluminate ($LiAlO_2$) of specified crystalline structure in combination with specific carbonates composition greatly improves thermal cycling of fuel cell electrolytes.

The beta-lithium aluminate ($LiAlO_2$) preferably used in the inert support portion of the fuel cell electrolyte of this invention has the x-ray powder diffraction characteristics set forth in U.S. Pat. No. 3,998,939 for $\beta$-$LiAlO_2$. The $LiAlO_2$ used in the electrolyte of this invention has a crystalline structure having an average unit crystal length to diameter ratio (L/D) of greater than 3, preferably about 3 to about 20, and especially preferred is an average L/D ratio of about 3 to about 10. The lithium aluminate useful in the fuel cell electrolyte of this invention must also have a surface area greater than 5 sq. meters/gram. Surface areas of about 5 to about 30 sq. meters/gram are suitable, surface areas of about 10 to about 20 sq. meters/gram being preferred and about 10 to about 15 sq. meters/gram being especially preferred. During fuel cell operation, it is observed that a portion of the β-LiAlO₂ may be converted to a gamma crystal structure having a morphology similar to that set forth above for the β-LiAlO₂. Thus, after a period of cell operation both beta and gamma LiAlO₂ may be present and the crystal morphology will be within the above specified L/D and surface area dimensions. Any form of LiAlO₂ having crystal morphology within the above specified L/D and surface area dimensions is suitable for use in this invention.

FIG. 1 is an electron micrograph having a magnification of 10,000 times showing lithium aluminate crystalline structure suitable for use in the electrolyte according to this invention wherein the average L/D ratio is about 5.8 and the surface area is about 15 sq. meters/gram. The lithium aluminate shown in FIG. 1 was produced following the multi-thermal stage process of U.S. Pat. No. 3,998,939 by reaction of alumina having a surface area of 109 sq. meters/gram with a binary lithium and potassium carbonates mixture. The final composition was 59.23 wt. percent carbonates composition and 40.77 wt. percent LiAlO₂. The LiAlO₂ was 90 percent β, 5 percent γ and 5 percent α.

Suitable lithium aluminate for use in the electrolyte of this invention may be produced by the reaction of alumina with liquid phase lithium carbonate under reaction conditions of the multithermal stage process of U.S. Pat. No. 3,998,939. The crystalline structure of the reactant alumina does not appear to be an important feature in the production of the desired beta-lithium aluminate but the alumina reactant must have a surface area of greater than 100 sq. meters/gram, about 100 to 500 sq. meters/gram being preferred. The reactant alumina should not contain more than about 2 to 5 wt. percent non-volatile impurities including silica, titanium, iron or sodium oxides. It is preferred that the total non-volatile impurities of the alumina be less than 1 percent and especially preferred that the total non-volatile impurities in the reactant alumina be less than 0.1 wt. percent. Other processes for production of lithium aluminate, such as from the alkali metal hydroxides, may be used as long as the resultant aluminate has the above described crystalline characteristics.

The lithium aluminate of the inert carrier portion of the electrolyte according to this invention is about 30 to about 50 wt. percent of the total electrolyte and preferably initially is more than about 60 percent of the above described crystalline form of beta-lithium aluminate (β-LiAlO₂), preferably about 80 to 95 wt. percent of the above described crystalline form with the remaining lithium aluminate being primarily gamma-lithium aluminate. At the lower percentages of the beta form it is preferred that there be less than about 10 percent alpha-lithium aluminate present.

In assembly of the electrolytes of this invention for use in the fuel cell, the same or different carbonates composition may be used as was used in the preparation of aluminate. The carbonates composition in the fuel cell electrolyte is preferred to be about 50 to 70 wt. percent of the total electrolyte weight, about 60 to 62 wt. percent being especially preferred. Either a binary or a ternary carbonates composition is suitable as long as it has a thermal expansion of about 1.5 to 3.5 × 10⁻⁵ inch/inch ° C. and preferably about 1.75 to 2.25 × 10⁻⁵ inch/inch ° C. The thermal expansion of the combined aluminate and carbonates electrolyte should be 1.1 to about 2.5 × 10⁻⁵ inch/inch ° C. We have found that such thermal expansion characteristics are obtained by use of aluminates having the above described crystalline properties as inert support portions of fuel cell electrolytes with the above described carbonates composition. The carbonates compositions may be ternary lithium-potassium-sodium carbonates, binary lithium-potassium or binary lithium-sodium carbonates having a thermal expansion in the above range. The binary lithium-potassium composition is preferred.

The electrolytes of this invention are especially suitable for reinforcement to provide additional resistance to electrolyte cracking and concomitant cell power loss and failure. It is preferred to keep the reinforcement to a low volume percentage of the electrolyte since such reinforcement represents inactive electrolyte volume. We have found that about 2 to about 6 volume percent reinforcement significantly improves thermal cycling of electrolytes according to this invention, about 2 to about 4 volume percent being preferred. We prefer to use refractory metallic alloys containing principally Fe and Cr and about 2 to about 6 wt. percent aluminum, such as marketed under the name "Kanthal" by the Kanthal Corporation, Bethel, Conn.. Such alloys have shown good corrosion resistance in molten carbonate environments at fuel cell operating temperatures. Specific Kanthal compositions suitable as reinforcing in electrolytes of this invention include:

|  | Weight Percent | | | |
| --- | --- | --- | --- | --- |
|  | Al | Cr | Co | Fe |
| Type A-1 | 5.5 | 22 | .5 | 72 |
| Type A | 5 | 22 | .5 | 72.5 |
| Type D | 4.5 | 22 | .5 | 73 |

Fine screens, woven mesh, expanded sheets, fibers and particles can be used as reinforcement for electrolytes according to the invention. The reinforcing is placed in the desired location just prior to pressing the electrolyte. When fibers are used, it is desired that they be randomly and uniformly distributed throughout the electrolyte.

FIG. 2 shows the ability of a fuel cell according to this invention to withstand thermal cycling. The upper curve represents the power density decay, measured at the triangular points, of a fuel cell of this invention without thermal cycling and the lower curve shows the ability of a similar fuel cell of this invention to withstand thermal cycling for six cycles without appreciable loss of power as measured at the circular points. The cells had electrolytes of 175 sq. centimeters area and 0.071 thickness. The inert lithium aluminate support portion of the thermal cycled cell was 42.1 wt. percent of the electrolyte having a composition 85 percent β, 8 percent γ and 7 percent α. The surface area of the aluminate was 8.87 sq. meters/gram and the average L/D about 5.6. The carbonates composition was 57.9 wt. percent of the total electrolyte, 26.38 wt. percent Li₂CO₃ and 31.52 wt. percent K₂CO₃. The thermal expansion of the electrolyte was 1.62 × 10⁻⁵ inch/inch ° C. The inert support portion of the electrolyte was made according to the multi-thermal stage method of U.S. Pat. No. 3,998,939 using Al₂O₃ having a surface area of 105 sq. meters/gram to react with a binary Li₂CO₃ - K₂CO₃ carbonates composition. The electrolyte was reinforced with Kanthal fibers 0.005 diameter and 0.5 inches in length and making up 3.0 volume percent of the electrolyte.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An improved molten carbonate fuel cell electrolyte comprising about 30 to about 50 wt. percent of an inert support portion and about 50 to about 70 wt. percent of alkali metal carbonates composition, said inert support portion being principally $LiAlO_2$ having a crystalline structure with an average L/D greater than about 3 and surface area greater than about 5 sq. meters/gram and said carbonates composition is selected from the group consisting of a ternary lithium-potassium-sodium carbonates composition, a binary lithium-potassium carbonates composition and a binary lithium-sodium carbonates composition, said carbonates composition having a thermal expansion of about 1.5 to about 3.5 × $10^{-5}$ inch/inch ° C.

2. The improved fuel cell electrolyte of claim 1 wherein the $LiAlO_2$ has an average L/D of about 3 to about 20 and surface area of about 5 to about 30 sq. meters/gram.

3. The improved fuel cell electrolyte of claim 1 wherein the average L/D is about 3 to about 10.

4. The improved fuel cell electrolyte of claim 1 wherein the surface area is about 10 to about 20 sq. meters/gram.

5. The improved fuel cell electrolyte of claim 1 wherein the carbonates composition is a binary lithium-potassium carbonates composition.

6. The improved fuel cell electrolyte of claim 1 wherein the carbonates composition thermal expansion is about 1.75 to 2.25 × $10^{-5}$ inch/inch ° C.

7. The improved fuel cell electrolyte of claim 1 wherein the $LiAlO_2$ has an average L/D of about 3 to about 10 and a surface area of about 10 to about 20 sq. meters/gram and wherein the carbonates composition is binary lithium-potassium carbonates having a thermal expansion of about 1.75 to 2.25 × $10^{-5}$ inch/inch ° C.

8. The improved fuel cell electrolyte of claim 1 having about 2 to about 6 volume percent refractory metallic alloy reinforcement.

9. The improved fuel cell electrolyte of claim 8 having about 2 to about 4 volume percent alloy reinforcement, said alloy comprising principally Fe and Cr and about 2 to about 6 wt. percent aluminum.

10. The improved fuel cell electrolyte of claim 8 wherein said reinforcement is in the form of alloy fibers, said alloy comprising principally Fe and Cr and about 2 to about 6 wt. percent Al.

11. The improved fuel cell electrolyte of claim 8 wherein said reinforcement is in the form of metallic screen.

12. The improved fuel cell electrolyte of claim 1 wherein more than about 60 wt. percent of said $LiAlO_2$ is initially $\beta$-$LiAlO_2$.

13. The improved fuel cell electrolyte of claim 12 wherein 80 to 95 wt. percent of the $LiAlO_2$ is $\beta$-$LiAlO_2$ having an average L/D of about 3 to about 20 and surface area of about 5 to about 30 sq. meters/gram.

14. The improved fuel cell electrolyte of claim 12 wherein the average L/D is about 3 to about 10.

15. The improved fuel cell electrolyte of claim 12 wherein the surface area is about 10 to about 20 sq. meters/gram.

16. The improved fuel cell electrolyte of claim 12 wherein the carbonates composition is a binary lithium-potassium carbonates composition.

17. The improved fuel cell electrolyte of claim 12 wherein the carbonates composition thermal expansion is about 1.75 to 2.25 × $10^{-5}$ inch/inch ° C.

18. The improved fuel cell electrolyte of claim 12 wherein 80 to 95 wt. percent of the $LiAlO_2$ is $\beta$-$LiAlO_2$ having an average L/D of about 3 to about 10 and a surface area of about 10 to about 20 sq. meters/gram and wherein the carbonates composition is binary lithium-potassium carbonates having a thermal expansion of about 1.75 to 2.25 × $10^{-5}$ inch/inch ° C.

19. The improved fuel cell electrolyte of claim 12 having about 2 to about 6 volume percent refractory metallic alloy reinforcement.

20. The improved fuel cell electrolyte of claim 19 having about 2 to about 4 volume percent alloy reinforcement, said alloy comprising principally Fe and Cr and about 2 to about 6 wt. percent aluminum.

21. The improved fuel cell electrolyte of claim 19 wherein said reinforcement is in the form of alloy fibers, said alloy comprising principally Fe and Cr and about 2 to about 6 wt. percent Al.

22. The improved fuel cell electrolyte of claim 19 wherein said reinforcement is in the form of metallic screen.

23. The improved fuel cell electrolyte of claim 8 having about 2 to about 4 volume percent alloy reinforcement, said alloy containing principally Fe and Cr, about 2 to about 6 weight percent Al and about 0.5 weight percent Co.

24. The improved fuel cell electrolyte of claim 8 wherein said reinforcement is in the form of alloy fibers, said alloy containing principally Fe and Cr, about 2 to about 6 weight percent Al and about 0.5 weight percent Co.

25. The improved fuel cell electrolyte of claim 19 having about 2 to about 4 volume percent alloy reinforcement, said alloy containing principally Fe and Cr, about 2 to about 6 weight percent Al and about 0.5 weight percent Co.

26. The improved fuel cell electrolyte of claim 19 wherein said reinforcement is in the form of alloy fibers, said alloy containing principally Fe and Cr, about 2 to about 6 weight percent Al and about 0.5 weight percent Co.

* * * * *